US012590884B2

(12) United States Patent
Castaneda-Lopez et al.

(10) Patent No.: US 12,590,884 B2
(45) Date of Patent: Mar. 31, 2026

(54) METHOD FOR DETECTING CORROSION SEVERITY OF A METALLIC SURFACE ON A PIPELINE

(71) Applicants: Homero Castaneda-Lopez, College Station, TX (US); Lin Chen, College Station, TX (US)

(72) Inventors: Homero Castaneda-Lopez, College Station, TX (US); Lin Chen, College Station, TX (US)

( * ) Notice: Subject to any disclaimer, the term of this patent is extended or adjusted under 35 U.S.C. 154(b) by 100 days.

(21) Appl. No.: 18/464,703

(22) Filed: Sep. 11, 2023

(65) Prior Publication Data

US 2023/0417652 A1     Dec. 28, 2023

Related U.S. Application Data

(63) Continuation of application No. PCT/US2022/020121, filed on Mar. 14, 2022.

(60) Provisional application No. 63/161,076, filed on Mar. 15, 2021.

(51) Int. Cl.
*G01N 17/02*     (2006.01)
*G01N 17/00*     (2006.01)

(52) U.S. Cl.
CPC .......... *G01N 17/02* (2013.01); *G01N 17/006* (2013.01)

(58) Field of Classification Search
CPC ............................. G01N 17/02; G01N 17/006
USPC ......................................................... 324/71.2
See application file for complete search history.

(56) References Cited

U.S. PATENT DOCUMENTS

| | | | | |
|---|---|---|---|---|
| 2012/0205256 A1* | 8/2012 | Catte | ...................... | C23F 13/04 |
| | | | | 204/196.01 |
| 2015/0218712 A1* | 8/2015 | Chew | ...................... | C23F 13/06 |
| | | | | 118/620 |
| 2019/0127861 A1* | 5/2019 | Miller | ...................... | C23F 13/04 |
| 2021/0172860 A1* | 6/2021 | Al-Khaldi | ............... | C23F 13/06 |
| 2022/0049363 A1* | 2/2022 | Yang | ...................... | C23F 13/04 |
| 2023/0061824 A1* | 3/2023 | Ell | ........................... | C23F 13/04 |
| 2023/0366103 A1* | 11/2023 | Yang | ...................... | C23F 13/04 |

* cited by examiner

*Primary Examiner* — Raul J Rios Russo
(74) *Attorney, Agent, or Firm* — Benjamin Aaron Adler

(57) ABSTRACT

Provided herein are non-invasive and non-destructive methods for classifying the type of external corrosion defect and the severity thereof in the cathodic protection system on a buried pipeline. Mathematical tools and algorithms are utilized to classify the type and the severity of the corrosion defect.

11 Claims, 13 Drawing Sheets

WE – working electrode
RE – reference electrode
CE – counter electrode

Different Signals with time

METHOD FOR DETECTING CORROSION SEVERITY OF A METALLIC SURFACE ON A PIPELINE

CROSS-REFERENCE TO RELATED APPLICATION

This application is a continuation under 35 U.S.C. § 120 of pending international application PCT/US2022/020121, filed Mar. 14, 2022, which claims the benefit of priority under 35 U.S.C. § 119(e) of provisional application U.S. Ser. No. 63/161,076, filed Mar. 15, 2021, now abandoned, both of which are hereby incorporated in their entireties.

FEDERAL FUNDING LEGEND

This invention was made with government support under Grant Number 693JK31910018POTA awarded by the U.S. Department of Transportation Pipeline and Hazardous Materials Safety Administration. The government has certain rights in the invention.

BACKGROUND OF THE INVENTION

Field of the Invention

The present invention relates to the field of pipeline maintenance. More specifically, the present invention relates to non-destructive techniques and methods to detect the severity of corrosion of a metallic surface of a pipeline due to a coating failure.

Description of the Related Art

External corrosion on buried pipelines can result in gradual and usually localized metal loss on the exterior surface of failure coating, resulting in reduction of the wall thickness of the metallic structure. Indirect technologies, such as DC basis, i.e. DCVG and CIPS, have been able to detect and pinpoint two conditions in the pipeline, intact and holiday (no defect or coating anomaly) with good confidence. Classic DC methodologies monitor and characterize the state of the coating and effectiveness of cathodic protection by using transfer function principle, i.e. resistance. The formation of an electrochemical cell, such as buried coated pipeline with cathodic protection (steel in electrolyte) is formed at macro scale conditions (1-2). The expected damage evolution of the coated pipeline includes the electrolyte (soil+water) uptake within the coating. Once the water uptakes the coating it reacts at the coating/metallic interface. When the activation of the metallic surface starts, the dissolution and surface is modified. Either by third party damage or natural damage process, the surface activation is influenced by the soil conditions. The anodic or corrosion reaction, when it occurs due to the direct bridge or interaction between the soil and steel surface, can have different dissolution rates.

The conditions and contents of the soil promote and influence the electrochemical reactions and as consequence the surface conditions, also the corrosion rate is proportional to the surface modification following electrochemical reactions. DC technologies can identify the anomalies resulted due to the bridge between the soil and the metallic structure, the detection considers different resistances between coating (high impedance), corrosion products (semiconductor medium impedance) and steel surface (low impedance). The surface exposed to the soil will help to resolve such gradient.

CIPS and DCVG are clear examples of transfer function methods assuring the identification of such gradient due to the difference between two surfaces, metal and coating, (3-5) in contact with the electrolyte or soil.

Different levels of surface severity might be present when the survey method is deployed and is not able to capture the state of the metal surface. The lack of metallic surface severity detection can lead to misinterpretation of the threat resulted by the corrosion process and makes the maintenance prioritization difficult. The corrosion rate is influenced by the surrounding soil environment, the surface conditions existing at specific time and location might be in the intact state, passive state (corrosion products), active state (corrosion dissolution) or in somewhere in between active-passive state. Steel degradation in soil conditions leads to higher metal and wall loss in buried pipelines, the detection, recognition, and assessment of the severity level is the key to take important repairing decisions. Electrochemical characterization (5-6) and capacitance behavior can be a route to distinguish the corrosion severity and the distinction between different levels of dissolution.

Thus, there is a need in the art for improved methods for assessing the severity of corrosion of an underground pipeline. The present invention fulfills this longstanding need and desire in the art.

SUMMARY OF THE INVENTION

The present invention is directed to a method for detecting coating failures on a pipeline. In the method an area of interest is selected on the underground pipeline and continuous cathodic protection of the underground pipeline is disconnected. A change in the cathodic protection at the area of interest is plotted over a period of time to produce a profile thereof and correlating the profile is correlated with a coating failure or lack thereof at the area of interest.

The present invention is directed to a related method further comprising classifying severity of the coating failure based on polarization decay and an analysis of the profile. The present invention is directed to another related method further comprising selecting at least one additional area of interest on the pipeline and repeating the method steps.

The present invention also is directed to a method for classifying a severity of a corrosion defect on a metallic pipeline. In the method a test point is selected on the metallic pipeline and the voltage to a cathodic protection system on the metallic pipeline is switched off. An instantaneous potential relaxation is acquired at a plurality of acquisition times at the test point. The acquired instantaneous potential relaxation at the plurality of acquisition times is modeled to produce a potential relaxation curve and the potential relaxation curve is compared to a database of potential relaxation curves of a severity level of the corrosion defect, thereby classifying the severity of the corrosion defect. The present invention is directed to a related method further comprising selecting at least one additional test point on the metallic pipeline and repeating the method step.

The present invention is directed further to a non-invasive inspection method for a buried metallic pipeline with a cathodic protection system. In the method a plurality of inspection places are selected along the metallic pipeline and turning off the cathodic protection system to the metallic pipeline is turned off. For each of the plurality of inspection places a plurality of instantaneous relaxation voltages each acquired at a predetermined time point are modeled as a potential relaxation curve. Each of the potential relaxation curves is compared to a database of potential relaxation curves that are correlated with a level of corrosion and each of the plurality of inspection places on the buried pipeline is identified as comprising a level of corrosion or without corrosion.

DETAILED DESCRIPTION OF THE INVENTION

Figures 1A, 1B, 1C, 2:
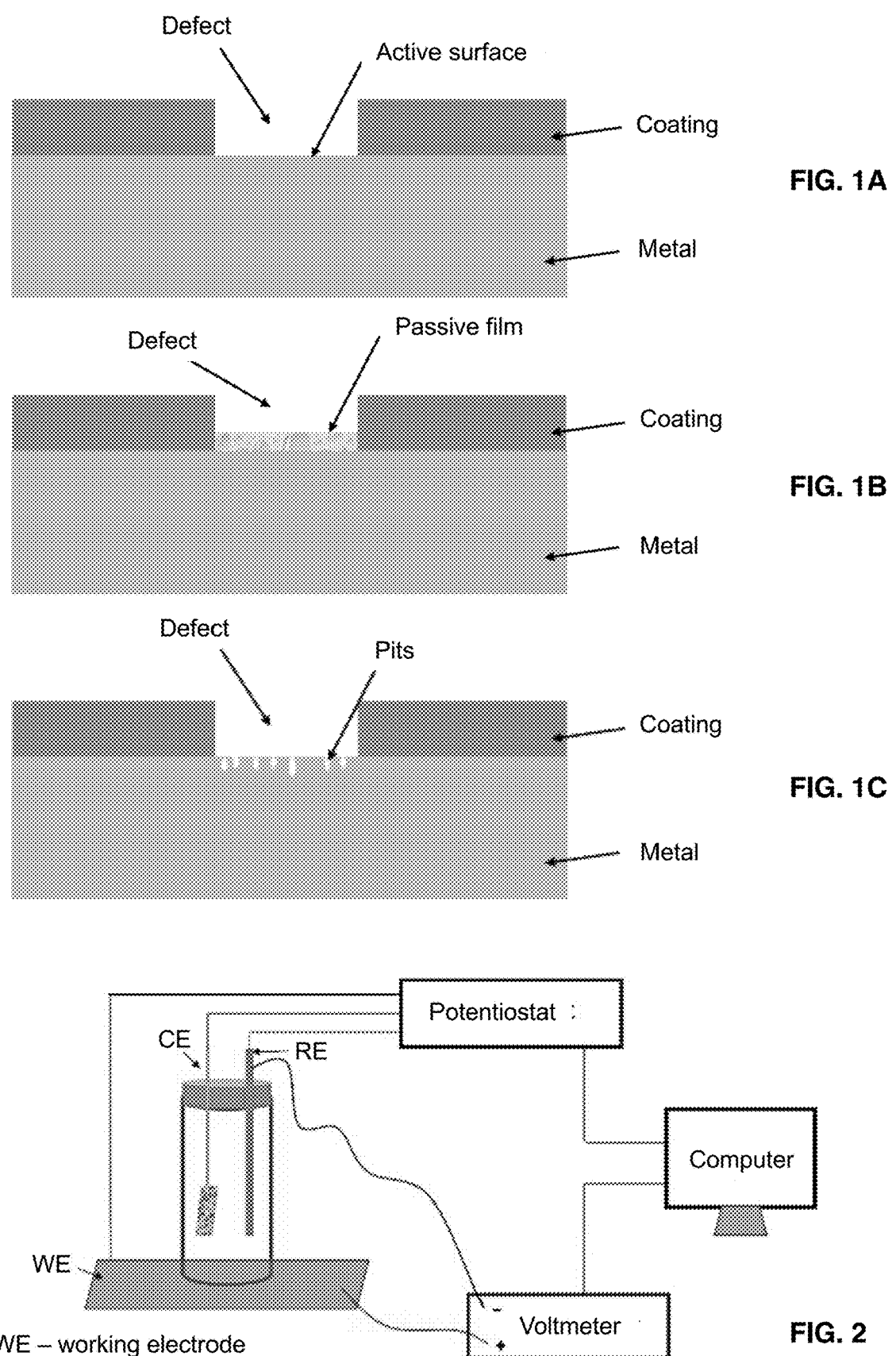
FIGS. 1A-1C are schematic views of a metallic pipe coating with an active defect (FIG. 1A), an activated/passivated defect (FIG. 1B) and a pitting defect (FIG. 1C).
FIG. 2 is a schematic illustrating the connection with electrochemical cells in the electrode system used in the experimental setup.

As used herein, the term "a" or "an" when used in conjunction with the term "comprising" in the claims and/or the specification may mean "one," but it is also consistent with the meaning of "one or more," "at least one," and "one or more than one." Some embodiments of the invention may consist of or consist essentially of one or more elements, method steps, and/or methods of the invention. It is contemplated that any method described herein can be implemented with respect to any other method described herein.

As used herein, the term "or" in the claims is used to mean "and/or" unless explicitly indicated to refer to alternatives only or the alternatives are mutually exclusive, although the disclosure supports a definition that refers to only alternatives and "and/or."

As used herein, "comprise" and its variations, such as "comprises" and "comprising," will be understood to imply the inclusion of a stated item, element or step or group of items, elements or steps but not the exclusion of any other item, element or step or group of items, elements or steps unless the context requires otherwise. Similarly, "another" or "other" may mean at least a second or more of the same or different claim element or components thereof.

As used herein, the terms "coating" and "external coating" are interchangeable.

In one embodiment of the present invention, there is provided a method for detecting coating failures on a pipeline, comprising selecting an area of interest on the underground pipeline; disconnecting a continuous cathodic protection of the underground pipeline; plotting a change in the cathodic protection at the area of interest over a period of time to produce a profile thereof; and correlating the profile with a coating failure or lack thereof at the area of interest.

Further to this embodiment the method comprises classifying severity of the coating failure based on a polarization decay and an analysis of the profile. In one aspect of this further embodiment the profile may be one of potential decay measured at select acquisition times within the period of time. In another aspect of this embodiment the profile may be one of instantaneous relaxation potential measured at select acquisition times within the period of time. In this further embodiment and both aspects thereof the coating type may be a single layer fusion bonded epoxy coating, a three-layer fusion bonded epoxy coating, a multilayer fusion bonded epoxy coating, or a coal tar. In another further embodiment the method comprises selecting at least one additional area of interest on the pipeline and repeating the method steps.

In all embodiments and aspects thereof the coating failure may be an active surface, an active surface with pitting, a bare metallic surface, or a passive surface. Also, the pipeline may be an underground pipeline or a submerged pipeline. In addition the steps to detect the coating failure may be both non-invasive and non-destructive to the pipeline.

In another embodiment of the present invention there is provided a method for a method for classifying a severity of a corrosion defect on a metallic pipeline, comprising selecting a test point on the metallic pipeline; switching off voltage to a cathodic protection system on the metallic pipeline; acquiring an instantaneous potential relaxation at a plurality of acquisition times at the test point; modeling the acquired instantaneous potential relaxation at the plurality of acquisition times to produce a potential relaxation curve; and comparing the potential relaxation curve to a database of potential relaxation curves of a severity level of the corrosion defect, thereby classifying the severity of the corrosion defect. Further to this embodiment the method comprises selecting at least one additional test point on the metallic pipeline and repeating the method steps.

In both embodiments the severity level of the corrosion defect may be active dissolution, pitting, passive, or no corrosion. Also in both embodiments the corrosion defect may occur in an external coating on the metallic pipeline. Particularly, the external coating may be a single layer fusion bonded epoxy coating, a three-layer fusion bonded epoxy coating, a multilayer fusion bonded epoxy coating, or a coal tar. Furthermore, the metallic pipeline may be an underground pipeline or a submerged pipeline.

In yet another embodiment of the present invention there is provided a non-invasive inspection method for a buried metallic pipeline with a cathodic protection system, comprising selecting a plurality of inspection places along the metallic pipeline; turning off the cathodic protection system to the metallic pipeline; modeling for each of the plurality of inspection places a plurality of instantaneous relaxation voltages each acquired at a predetermined time point as a potential relaxation curve; comparing each of the potential relaxation curves to a database of potential relaxation curves that are correlated with a level of corrosion; and identifying each of the plurality of inspection places on the buried pipeline as comprising a level of corrosion or without corrosion.

In this embodiment the level of the corrosion may be active dissolution, pitting, passive, or no corrosion. Also the corrosion may occur in an external coating on the metallic pipeline. Representative examples of an external coating are a single layer fusion bonded epoxy coating, a three-layer fusion bonded epoxy coating, a multilayer fusion bonded epoxy coating, or a coal tar. Furthermore the buried metallic pipeline may be underground or underwater.

Provided herein are methods for detecting coating failures or corrosion defects in the cathodic protection system on a pipeline and for classifying the severity of the coating failure or corrosion defect. The methods are both non-invasive and non-destructive. The methods provide for a non-invasive and non-destructive process for inspecting the external coating on the pipeline at any testing point, location, area or length of the pipeline.

The pipeline is a metallic pipeline that is buried underground or submerged underwater. The pipeline utilizes a cathodic protection system which comprises a coating or external coating, such as, but not limited to, a fusion bonded epoxy (FBE) or coal tar. The coating may comprise at least one layer. The coating failure or holiday may be classified as an active surface, active surface with pitting, a passive surface, or intact and result from interfacial changes occurring between the coating and the soil surrounding the pipeline or the ocean bed or floor of a body of water in which the pipeline is submerged.

In the methods cathodic protection may be a parameter influencing the severity detection where capacitive conditions in the cathodic protection system due to the interfacial changes may be captured during charging and discharging process. Relaxation time demonstrates the differences between surface conditions of the metallic buried structure when there is a bridge between soil and metallic structure. Relaxation time as modeled in relaxation potential curves may be used to create a corrosion severity database against which the results of future inspections may be compared to classify the type and severity of the defect.

Mathematical tools are implemented to filter and to classify the severity of corrosion in buried or submerged metallic structures or pipelines based on the relaxation conditions. For example the mathematical tool may comprise a probabilistic, semi-empirical equation or machine learning algorithm. In a non-limiting example the mathematical tool may classify the severity of corrosion in a model that utilizes the initial voltage of the cathodic protection system, the initial time when cathodic protection is switched off and model parameters that characterize the type of defect given an initial level of cathodic protection to determine instantaneous relaxation voltage at a plurality of times. Mathematical tools, algorithms and databases useful in the methods may be tangibly stored in or tangibly accessible by a computer system or other electronic system comprising at least a memory, a processor and at least one network connection.

The following examples are given for the purpose of illustrating various embodiments of the invention and are not meant to limit the present invention in any fashion.

Example 1

Experimental Parameters to Simulate Soil or Buried Conditions at Different pH

The effects of soil resistivity (or conductivity), pH and the metallic surface condition in the presence of holidays (specifically intact, active (FIG. 1A) and passive (FIG. 1B) state) under cathodic protection were examined. The experimental design performed is presented in Table 1 and the set-up is shown in FIG. 2 that includes the simulation conditions of the field and the parameters considered first level or critical for the detection and characterization parameters needed and the severity mapping. The active holiday included a metallic surface with a defined defect area with all parameters in the table simulating the most sensitive. The severity simulated marked three conditions, the intact coating condition, the active and the passive condition. Buffer solution (with defined conductivity and TDS Standards) is applied to adjust solution resistivity. The passive holiday is realized by external anodic current via potentiostat (Gamry, The Interface 600Plus™). NS4 solution with composition (unit: g/L) of KCl: 0.122, $NaHCO_3$: 0.483, $CaCl_2$: 0.093 and $MgSO_4$: 0.131 is used to simulate soil conditions.

TABLE 1

Experimental design matrix for electrochemical measurements

| Samples | Coatings Thickness | Soil Composition | Distribution of soil in ohm cm (resistivity) | Severity based on active-passive concept | pH |
|---|---|---|---|---|---|
| AISI 1008/ API X52 | 10-20 mils | NS4 | 1036 | Active Holiday | 4 |
| AISI 1008/ API X52 | 10-20 mils | NS4 | 1036 | Active Holiday | 7 |
| AISI 1008/ API X52 | 10-20 mils | NS4 | 1036 | Active Holiday | 10 |
| AISI 1008/ API X52 | 10-20 mils | NS4 | 1036 | Passive Holiday | 4 |
| AISI 1008/ API X52 | 10-20 mils | NS4 | 1036 | Passive Holiday | 7 |
| AISI 1008/ API X52 | 10-20 mils | NS4 | 1036 | Passive Holiday | 10 |
| AISI 1008/ API X52 | 10-20 mils | NS4 | 714 | Active Holiday | 4 |
| AISI 1008/ API X52 | 10-20 mils | NS4 | 714 | Active Holiday | 7 |
| AISI 1008/ API X52 | 10-20 mils | NS4 | 714 | Active Holiday | 10 |
| AISI 1008/ API X52 | 10-20 mils | NS4 | 714 | Passive Holiday | 4 |
| AISI 1008/ API X52 | 10-20 mils | NS4 | 714 | Passive Holiday | 7 |
| AISI 1008/ API X52 | 10-20 mils | NS4 | 714 | Passive Holiday | 10 |
| AISI 1008/ API X52 | 10-20 mils | NS4 | 870 | Active Holiday | 4 |
| AISI 1008/ API X52 | 10-20 mils | NS4 | 870 | Active Holiday | 7 |

TABLE 1-continued

| | | | Distribution of soil in ohm cm (resistivity) | Severity based on active-passive concept | pH |
|---|---|---|---|---|---|
| Samples | Coatings Thickness | Soil Composition | | | |
| API X52 AISI 1008/ API X52 | 10-20 mils | NS4 | 870 | Active Holiday | 10 |
| AISI 1008/ API X52 | 10-20 mils | NS4 | 870 ohm cm | Passive Holiday | 4 |
| AISI 1008/ API X52 | 10-20 mils | NS4 | 870 ohm cm | Passive Holiday | 7 |
| AISI 1008/ API X52 | 10-20 mils | NS4 | 870 ohm cm | Passive Holiday | 10 |

Figure 3A:
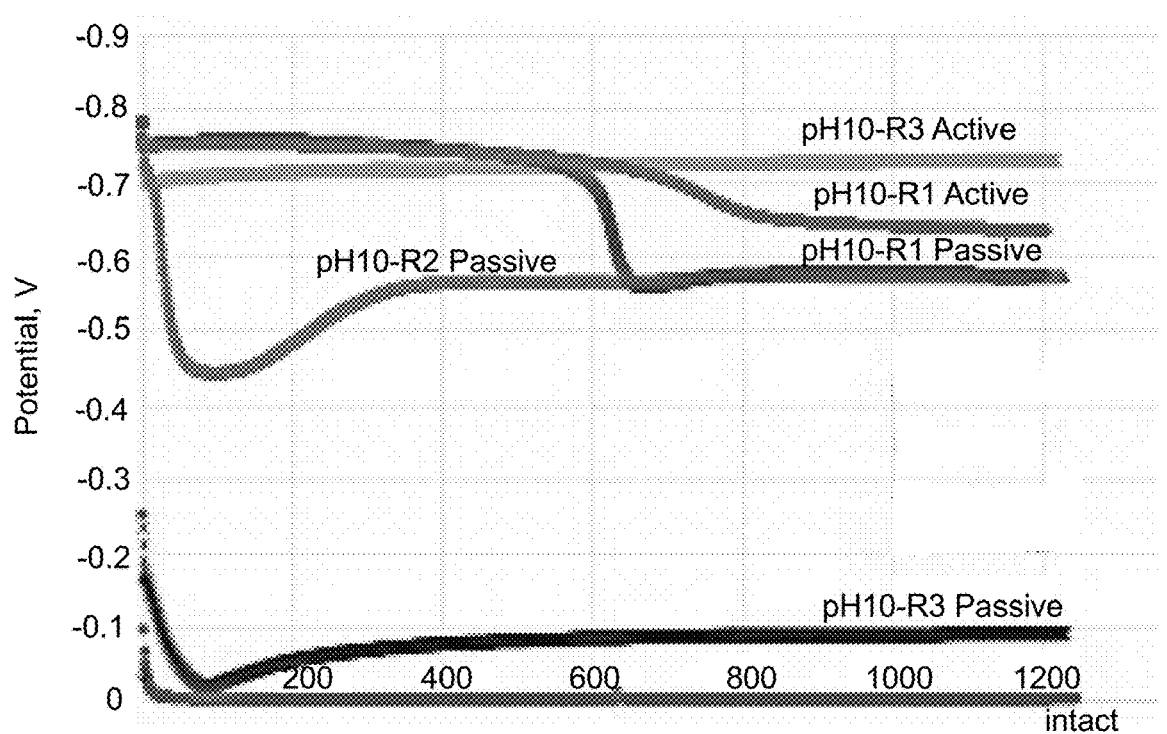
FIGS. 3A-3B show the potential on-off of an intact surface and active and passive holidays at pH10 for severity classification (FIG. 3A) and the severity due to the decay in potential (FIG. 3B).
Figure 3B:
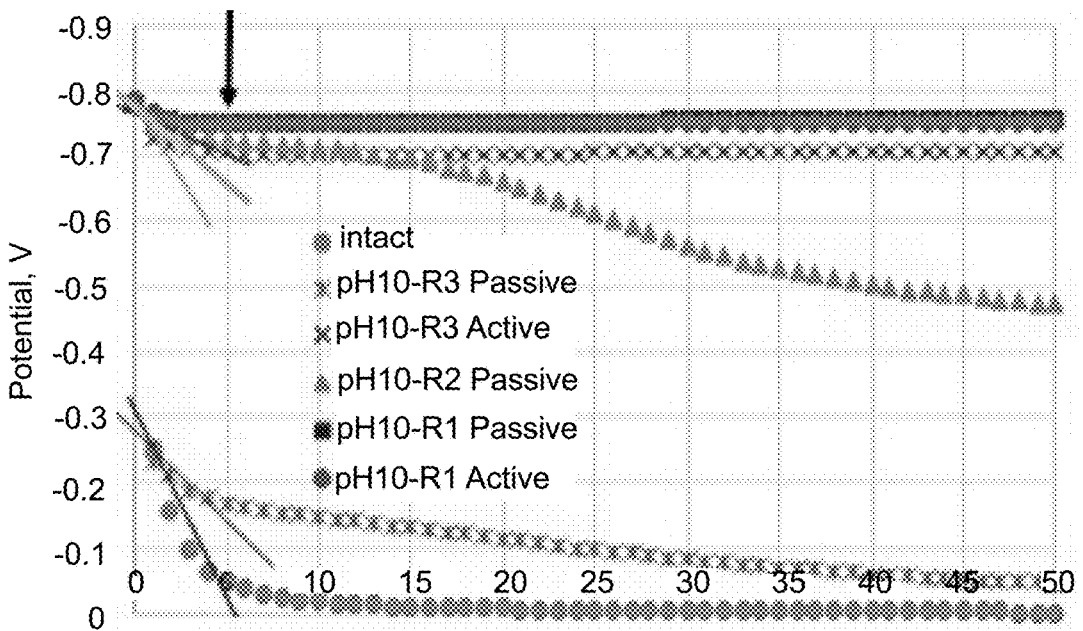

FIG. 3A shows potential on-off voltage vs. time for intact, active and passive holidays at pH10. FIG. 3B illustrates the polarization to the standard cathodic protection magnitude close to −0.85 vs Cu/CuSO₄ and the characterization with time. The intact sample includes a big drop as expected from the potentiostatic magnitude of −0.85V vs Cu/CuSO₄ to potential off conditions to reach close to zero potential vs reference. The slope was characteristic of this condition, all the intact samples had the same outcome. The active surface exposed to the electrolyte show a clear path of slow drop and constant high potential with a characteristic slope at the beginning of the off potential measurement (during the first 20 seconds). The passive condition includes different severity in the surface with specific corrosion rate conditions. The slope for the off potential is distinctive for different severity conditions and can be used to separate different surface conditions when the coating is not present. FIG. 3B shows the characteristic slopes presented for the passive state, the passive layer quality was predetermined and the off potentiostatic slope was able to distinguish different severity on the surface due to the oxide layer formed.

Example 2

Surface Severity Vs. Relaxation Times

Figure 4:
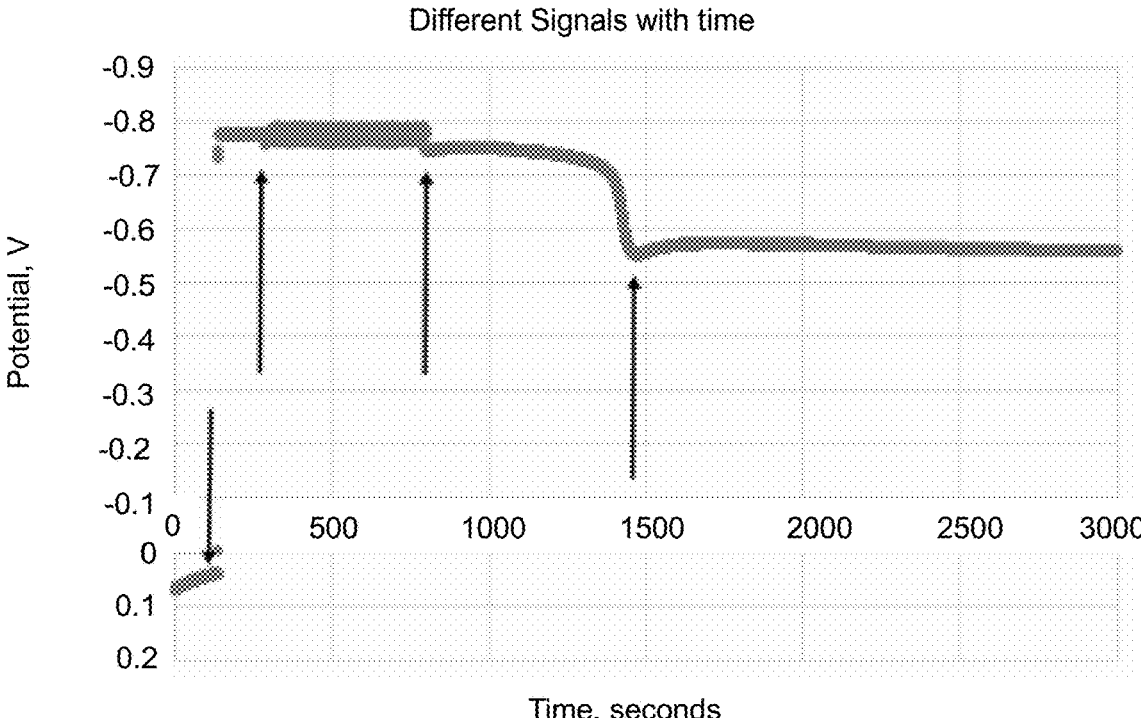
FIG. 4 shows the results of a potentiostatic test with time that includes the cathodic protection conditions of the simulated environment.

There are different methodologies with time that illustrate the parameters obtained as a consequence of the transfer function imposed in the set up. FIG. 4 starts with the potentiostatic test that includes the cathodic protection conditions of the simulated environment. The outcome of the off potential following the EIS or sine wave signal was able to distinguish several time constants due to the relaxation time experience when the system is off the polarization or cathodic protection conditions. The severity on the surface reveals the differences at different relaxation times, within a time frame of seconds the system was able to recognize differences between the surface defects and conditions. There are different relaxation times depending on the surface and also electrolyte conditions. The relaxation time includes the stabilization of the imposed DC current and the steady state conditions following the polarization and signal used. FIG. 4 indicates each one of the events and techniques initiation.

Example 3

Characterization of Surface States and Effects of Different Cathodic Potentials

The potential evolution after cutting off cathodic potential is utilized to characterize different surface states of defect of coating (active surface, surface with pits, passive surface)

and the effects of different cathodic potential (−0.85 V vs Cu/CuSO₄,−1 V vs Cu/CuSO₄,−1.4 V vs Cu/CuSO₄). The corresponding experimental conditions were presented in Tables 2 and 3.

TABLE 2

Experimental conditions considering different surface states

| Sample | Soil Composition | Cathodic Protection (V vs. CuSO4/Cu) | Severity based on active-passive concept |
|---|---|---|---|
| API X52 | NS4 | −0.85 | Active Holiday |
| API X52 | NS4 | −0.85 | Active Holiday with pits |
| API X52 | NS4 | −0.85 | Passive Holiday |

TABLE 3

Experimental conditions considering different cathodic protection

| Sample | Soil Composition | Cathodic Protection (V vs. CuSO4/Cu) | Severity based on active-passive concept |
|---|---|---|---|
| API X52 | NS4 | −0.85 | Active Holiday |
| API X52 | NS4 | −1 | Active Holiday |
| API X52 | NS4 | −1.4 | Active Holiday |

Figure 5:
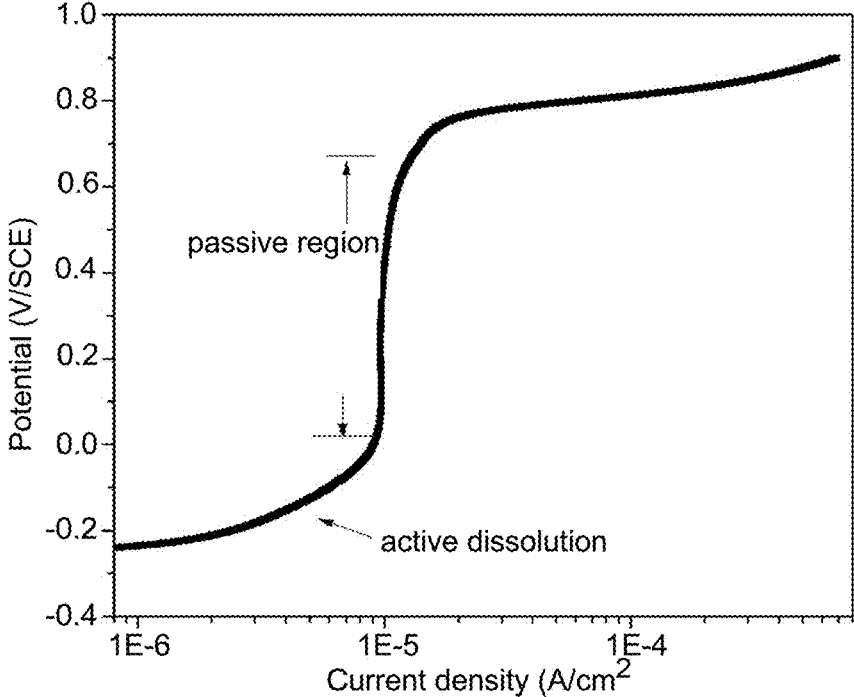
FIG. 5 is a potentiodynamic polarization curve of carbon steel for 3 hours in a carbonate-bicarbonate buffer solution with a pH of 10.
Figure 6A:
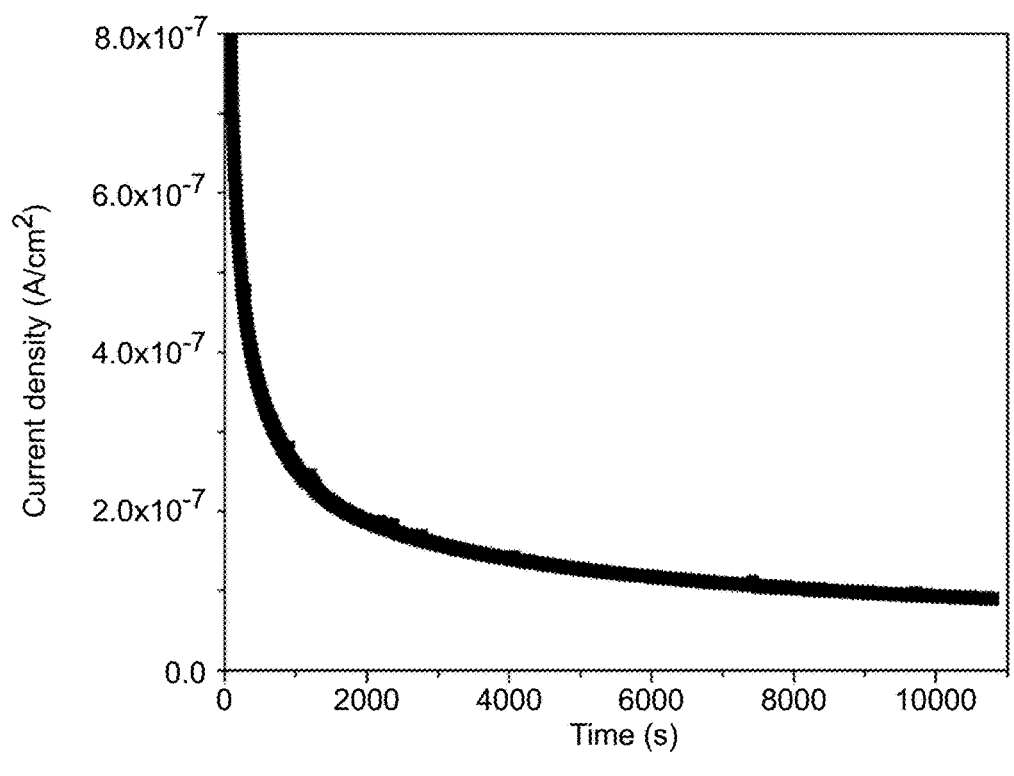
FIGS. 6A-6B show the current density response of carbon steel to potentiostatically polarized at 0.3 V (FIG. 6A) or 0.9 V (FIG. 6B) vs Cu/CuSO4 for 3 hours in a carbonate-bicarbonate buffer solution with a pH of 10.
Figure 6B:
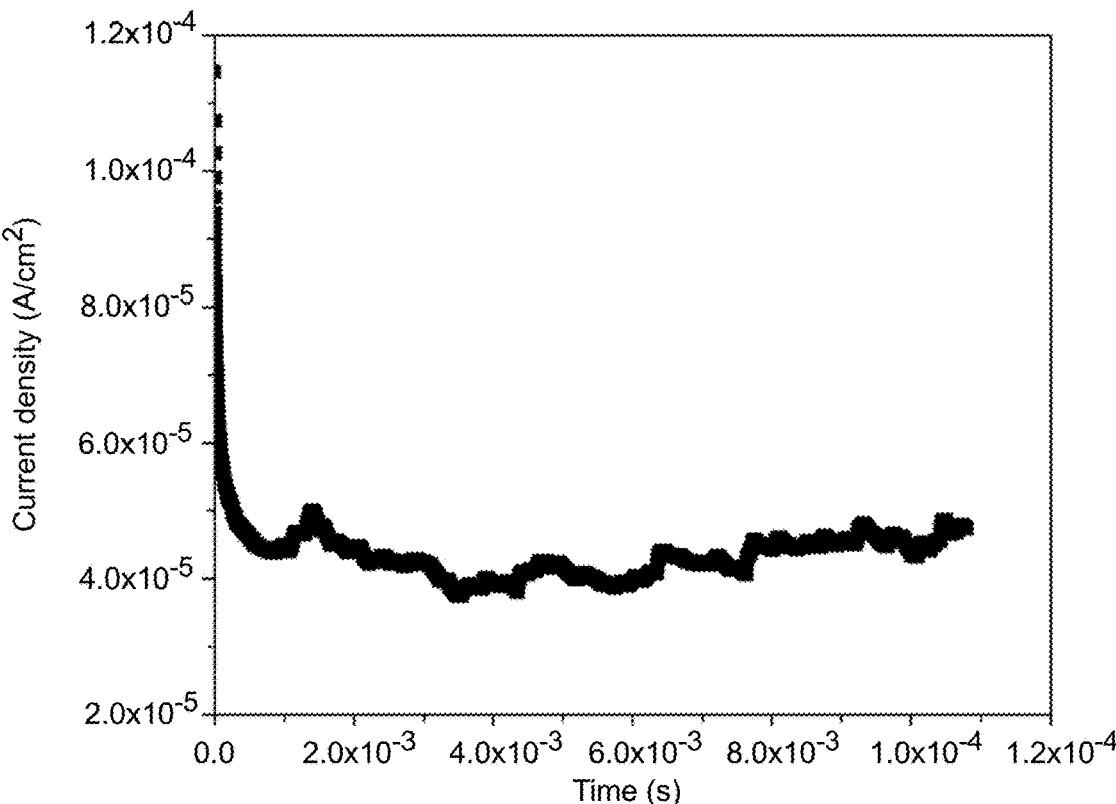

The surface states (FIGS. 1A-1C) of defect were controlled by applying different external potentials. The external potential was determined by potentiodynamic polarization curves. The carbon steel was polarized in a sodium carbonate-bicarbonate buffer solution with a pH of 10 at a scan rate of 0.167 mV/s. A wide stage of passivation between −0.2 V/SCE to 0.8 V/SCE was observed from FIG. 5. The potential of 0.3 V/SCE was applied on the defect for 3 hours to form a passive film. The corresponding current density was presented in FIG. 6A. A continuous decrease in current density was observed in the magnitude of $10^{-7}$ A/cm 2. The potential of 0.9 V/SCE was chosen to form pits on the defects. The fluctuation of current density in the magnitude of $10^{-5}$ A/cm² in FIG. 6B shows the presence of pits and unstable surface state. The active surface is in natural state without any pretreatment.

Figure 7A:
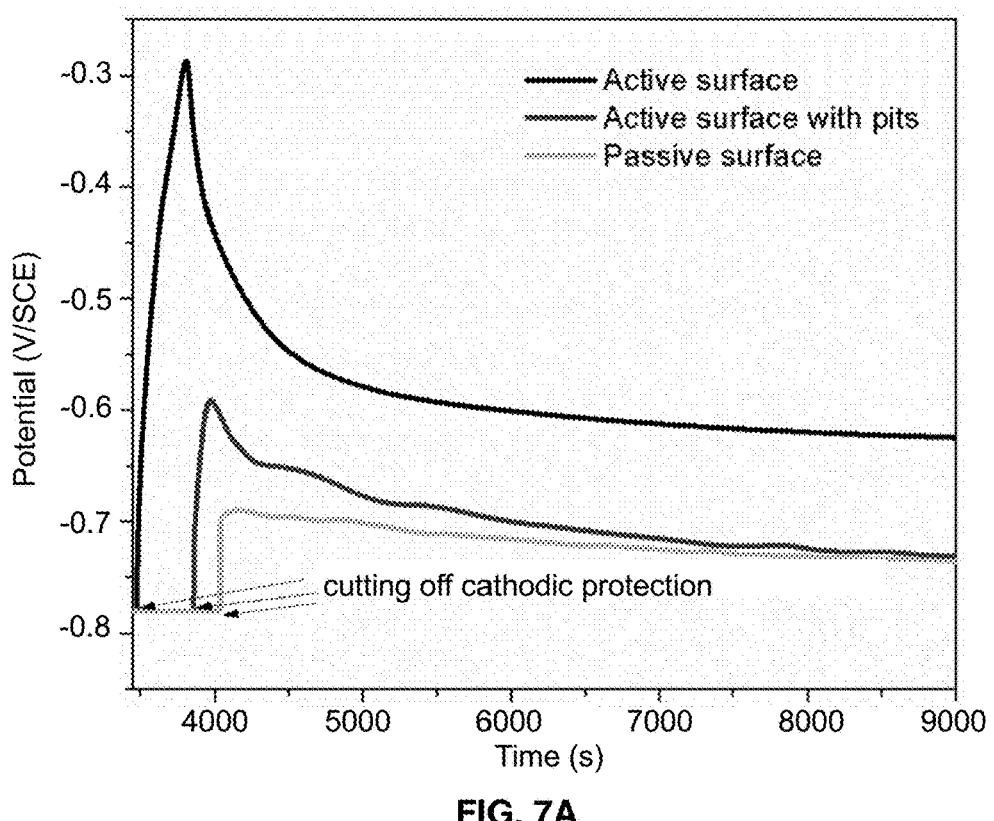
FIGS. 7A-7B show the potential evolution of carbon steel after cutting off different surface states (FIG. 7A) and different cathodic potentials (FIG. 7B).

The potential evolution after cutting off cathodic potential of −0.854 V vs. Cu/CuSO₄ was presented in FIG. 7A. The initial increase in potential of active surface is the highest for active surface, followed by active surface with pits and passive surface. After reaching a maximum, the potential then gradually decreases. The decrease in potential of active surface is comparatively smooth due to uniform corrosion. The unsmooth decrease in potential of passive surface and surface with pits come from the invasion of chloride ions and pits, respectively. The decay of potential after switch off cathodic protection can be used to distinguish surface state of defects.

Figure 7B:
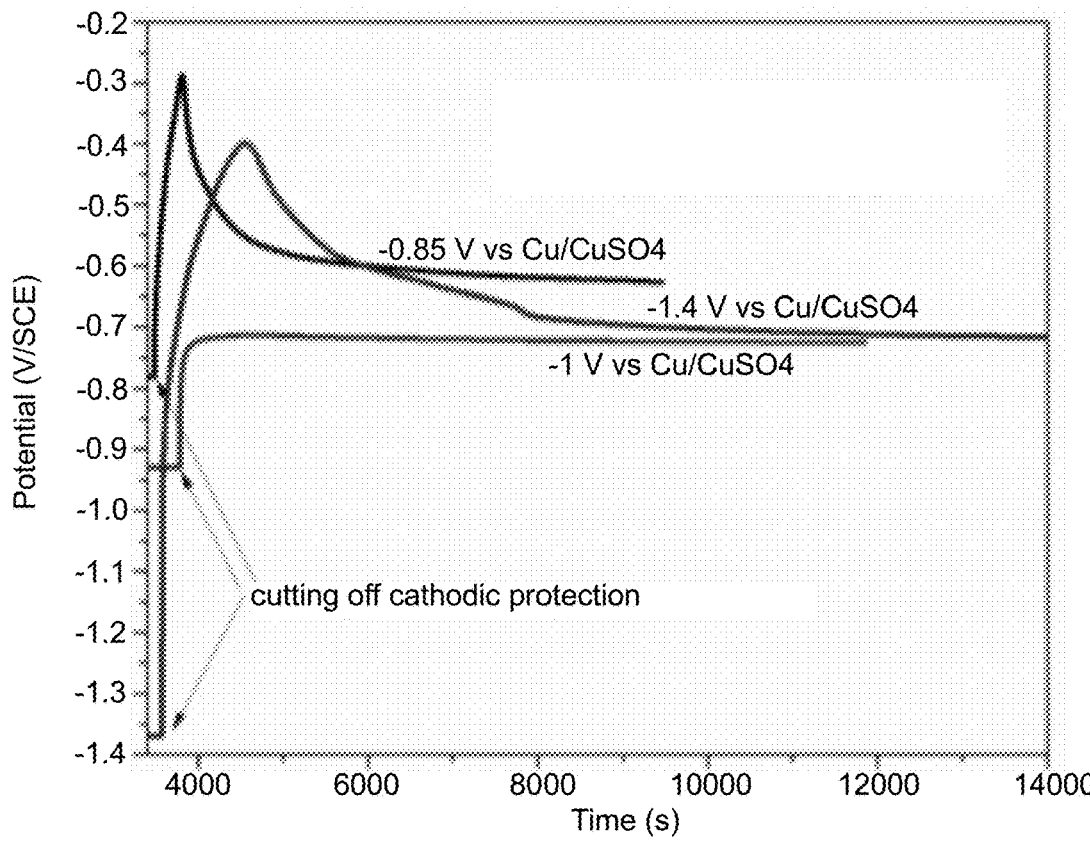

The potential evolution after cutting off different cathodic potential was shown in FIG. 7B. At −1 V vs. Cu/CuSO₄, the potential reaches a peak and then almost keeps constant. When the cathodic potential decreases to −1.4 V vs. Cu/CuSO₄, the instant increase in potential is much slower than that of −0.85 V vs. Cu/CuSO₄, followed by an unstable decrease in potential. The potential change at −1.4 V vs. Cu/CuSO₄ is similar to the result of potential decay of active surface with pits in FIG. 8, possibly coming from crevice showing up at metal/coating interface due to produced hydrogen gas and over protection.

Example 4

Experimental Parameters to Simulate Soil or Buried Conditions

Fusion Bonded Epoxy (FBE) and coal tar epoxy coating were applied on API X52 steels. An induced holiday with size of 0.5 cm×0.5 cm was created on the surface. Three types of defects were considered (FIGS. 1A-1C). An active defect means the natural state of the defect. The passive surface was controlled by applying an external potential to form a passive film on the metal surface. The pitting defect was created by following the potentiodynamic curve where the pitting potential is met. The external potential was determined by potentiodynamic polarization curves. NS4 solution (KCl: 0.122 g/L, NaHCO$_3$: 0.483 g/L, CaCl$_2$): 0.093 g/L and MgSO$_4$: 0.131 g/L) was used to simulate the soil environment.

Table 4 shows the experimental parameters simulating the soil or buried conditions considering the cathodic protection in combination with the coating and the holiday.

TABLE 4

Experimental matrix

| Substrate metal | Coating | Soil Composition | Cathodic polarization (V/CSE) | Severity based on the active-passive concept |
|---|---|---|---|---|
| API X52 | FBE | NS4 | −0.85 | Holiday with pitting |
| API X52 | FBE | NS4 | −0.85 | Active Holiday |
| API X52 | FBE | NS4 | −0.85 | Passive Holiday |
| API X52 | FBE | NS4 | −1 | Holiday with pitting |
| API X52 | FBE | NS4 | −1 | Active Holiday |
| API X52 | FBE | NS4 | −1 | Passive Holiday |
| API X52 | FBE | NS4 | −1.4 | Holiday with pitting |
| API X52 | FBE | NS4 | −1.4 | Active Holiday |
| API X52 | FBE | NS4 | −1.4 | Passive Holiday |
| API X52 | Coal tar | NS4 | −0.85 | Holiday with pitting |
| API X52 | Coal tar | NS4 | −0.85 | Active Holiday |
| API X52 | Coal tar | NS4 | −0.85 | Passive Holiday |
| API X52 | Coal tar | NS4 | −1 | Holiday with pitting |
| API X52 | Coal tar | NS4 | −1 | Active Holiday |
| API X52 | Coal tar | NS4 | −1 | Passive Holiday |
| API X52 | Coal tar | NS4 | −1.4 | Holiday with pitting |
| API X52 | Coal tar | NS4 | −1.4 | Active Holiday |
| API X52 | Coal tar | NS4 | −1.4 | Passive Holiday |

Electrochemical Measurements

The X52 steel was polarized in a sodium carbonate-bicarbonate buffer solution with a pH of 10 at a scan rate of 0.167 mV/s. The scanning range starts from −0.25 V to 1.2 V versus open circuit potential (OCP). Potentiostatic polarization with a constant external potential was applied on the metal surface for 3 hours to ensure the formation of a passive layer. To characterize the formation of the passive film, the electrochemical impedance spectrum (EIS) method was used with the frequency range starting from 100 kHz to 10 mHz with an amplitude of 10 mV.

The cathodic protection is conducted on the sample surface with different potentials −0.914 V/SCE (−0.85 V/CSE),−1.064 V/SCE (−1 V/CSE) and −1.464 V/SCE (−1.4 V/CSE). A sequence of EIS and 10-minute potentiostatic polarization with the biased potential was performed. After cutting off cathodic protection, the potential change of the electrochemical system was recorded by the voltmeter. The potentiostat and voltmeter were used to apply cathodic potential and record potential output after cutting off the cathodic protection. Three electrode system was used with a platinum gauze and a saturated calomel electrode (SCE) used as a counter electrode (CE) and reference electrode (RE) respectively as illustrated in FIG. 2. The positive and negative poles of voltmeter connected to the specimens (WE) and RE, respectively.

Example 5

Results

Potentiodynamic Polarization

Figure 8A:
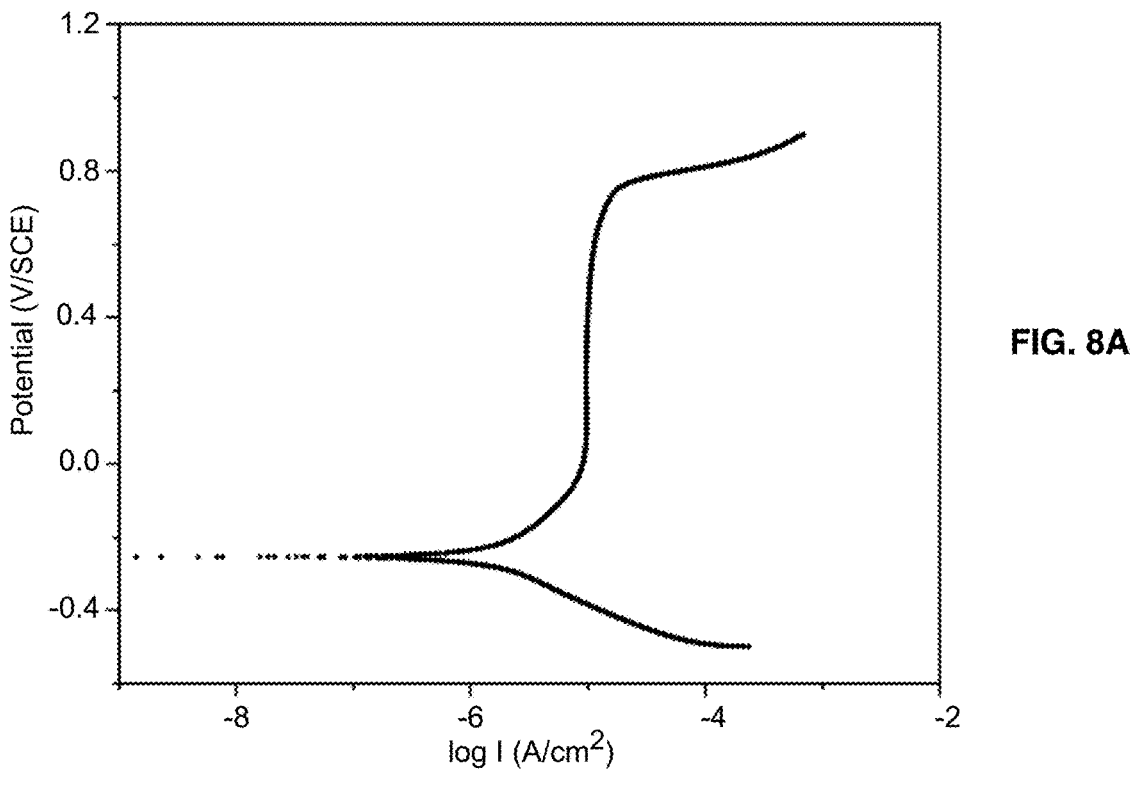
FIGS. 8A-8B are graphs of potentiodynamic polarization curves of X52 steel (FIG. 8A) and current density response under polarization of 0.3V/SCE (FIG. 8B).
Figure 8B:
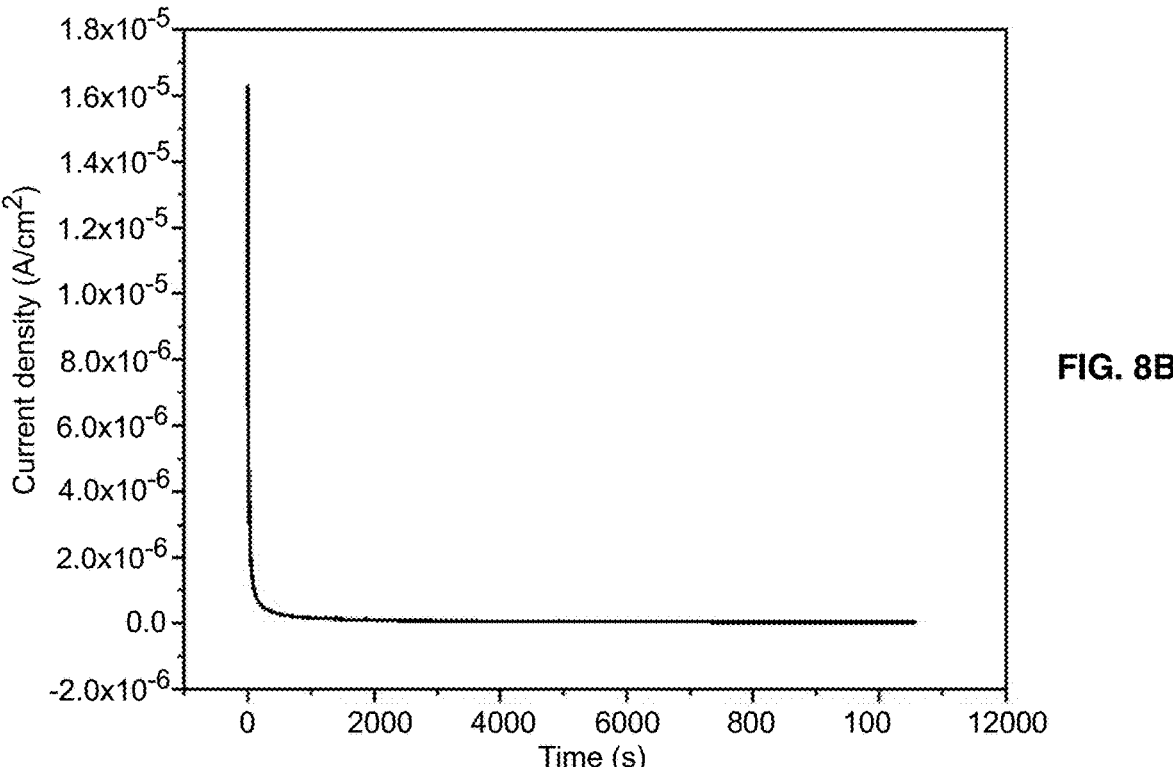

A wide passivation zone between 0 V/SCE to 0.8 V/SCE was observed as displayed in FIG. 8A, where 0.3 V/SCE was selected to form a passive film by polarizing samples surface for 3 hours. A final current density of around 150 nA/cm$^2$ was observed in FIG. 8B. Based on FIG. 8A there are different active states and one passive state region condition.

Characterization of Passive Film

Figure 9A:
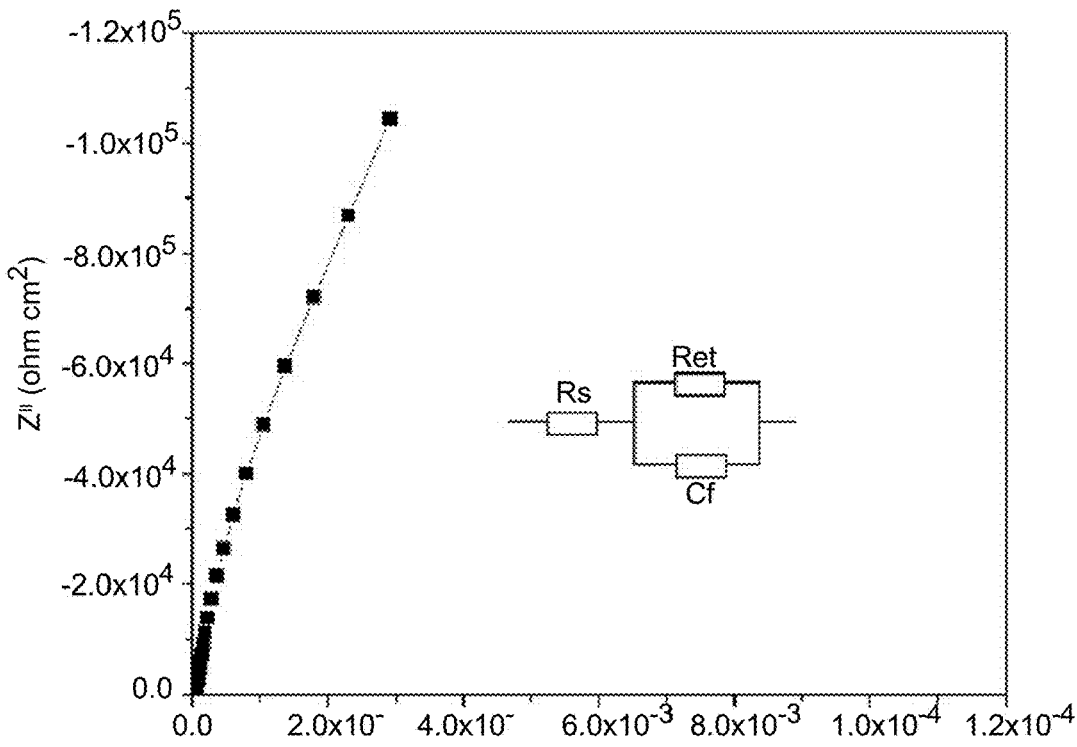
FIGS. 9A-9B are a nyquist plot (FIG. 9A) and a phase angle plot (FIG. 9B) of specimens after potentiostatic polarization for 3 hours in carbonate-bicarbonate buffer solution at pH 10.
Figure 9B:
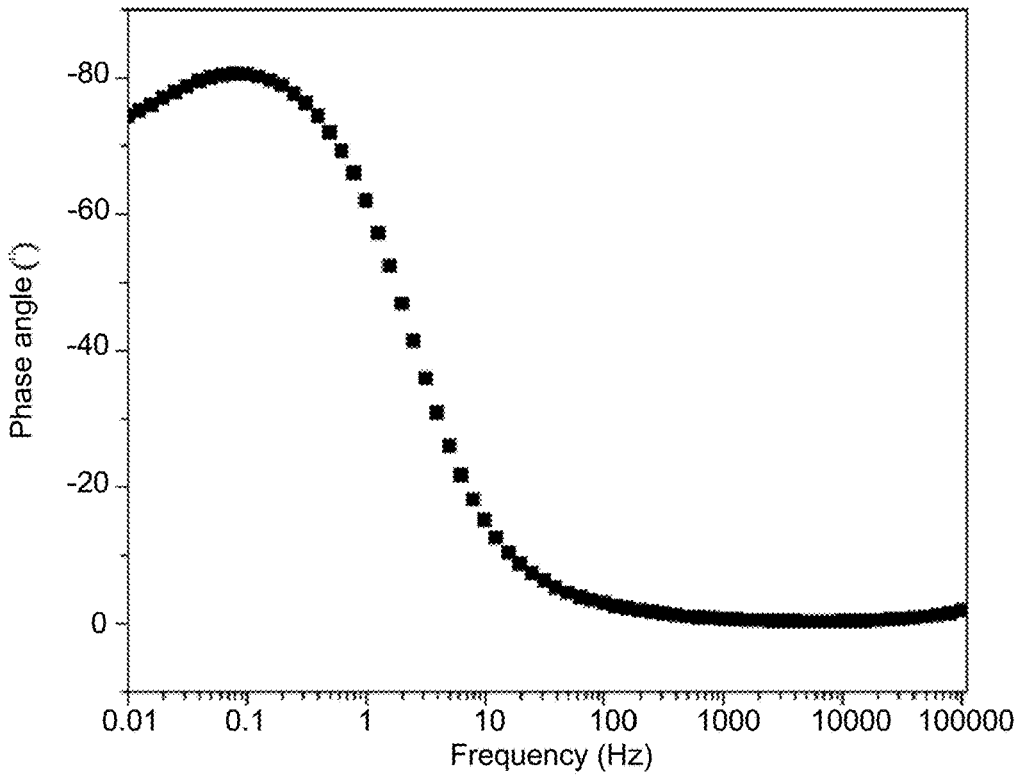

The formation of the passive film was reflected by a typically impressed semicircle in FIGS. 9A-9B generated by using the EIS method. The peaked phase angle close to 90° characterizes the formation of a passive film and capacitive like behavior. Based on EIS results, the equivalent circuit inserted in FIG. 9A was used to fit the capacitance of the passive film. R$_s$ and R$_{ct}$ represent the resistance of the solution and charge transfer process. C$_f$ characterizes the behavior of the passive film. The thickness d of the passive film can be calculated by d=ε$_r$ε$_0$ A/C, ε$_r$ (usually taken as 15.6), and ε$_0$ (8.85×10$^{-12}$ F/m) is the dielectric constant of iron oxide and vacuum. A is an area of 7.065 cm$^2$. Based on the fitting value of C$_f$ (8.042×10$^{-4}$ F), the thickness of the passive film is around 97.5 nm.

Relaxation Potential Following Instant Off Potential

Figures 10A, 10B, 10C:
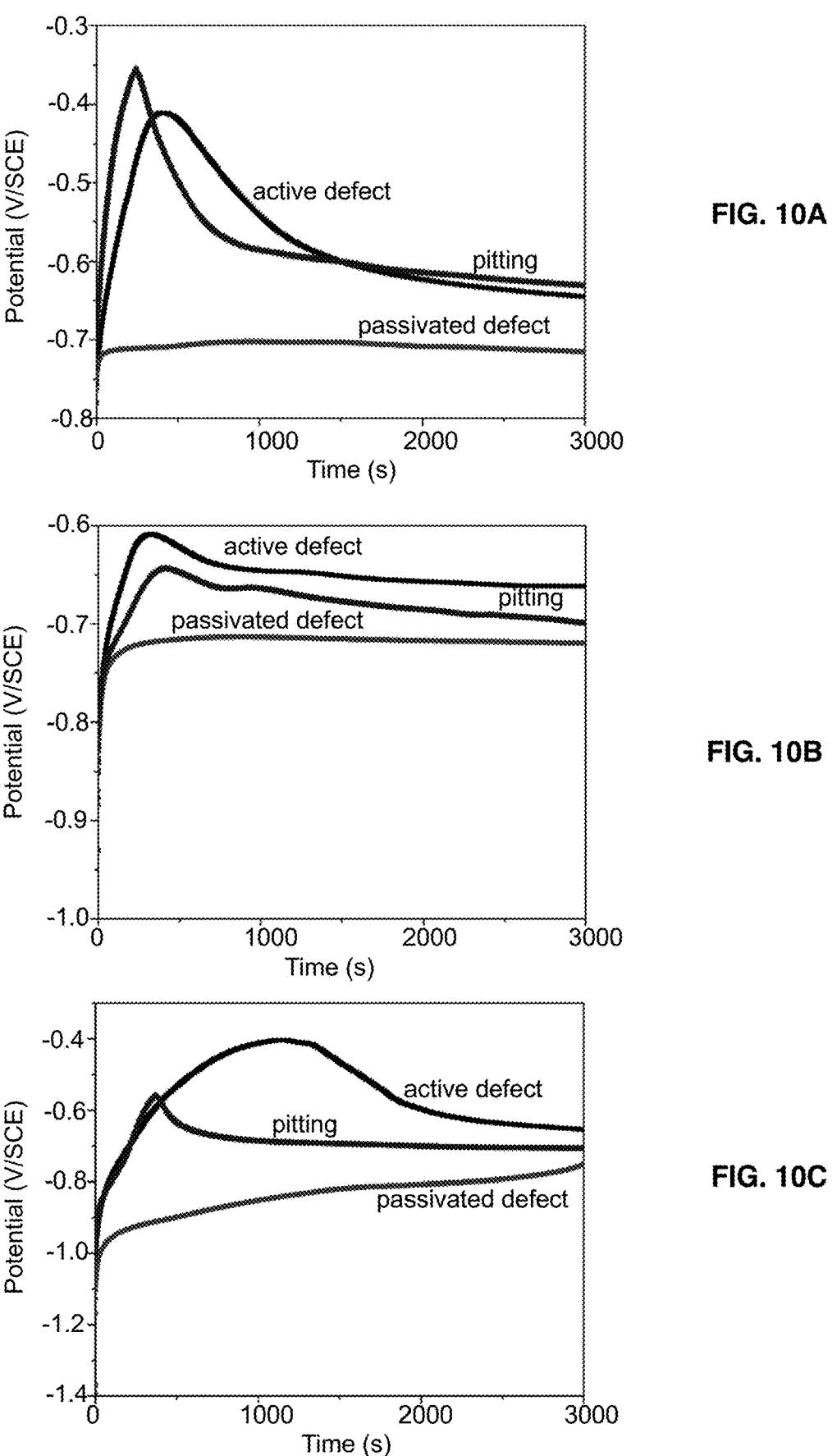
FIGS. 10A-10C show the potential change after cutting the cathodic potential of the coal tar coating with an active/passivated defect, and defect with pitting under potential of potentials −0.914 V/SCE (−0.85 V/CSE) (FIG. 10A),−1.064 V/SCE (−1 V/CSE) (FIG. 10B) and −1.464 V/SCE (−1.4 V/CSE) (FIG. 10C).

When the continuous cathodic protection is disconnected in the electrical circuit within a pipeline, the potential changes with time. The total potential in an electrochemical cell includes the contribution of thermodynamic potential, cathodic and anodic polarization and ohmic drop. When the current is not flowing in the circuit, the system reacts with time as shown in FIGS. 10A-10C which presents the potential decay following the instant off when we have different cathodic protection conditions. For coal tar coating with the presence of a defect, after cutting off the potential following polarization conditions 0.914 V/SCE (−0.85 V/CSE), the potential increases instantly due to the residual charge, i.e., the IR drop after cutting off the potential in the solution. After reaching a transient peak, the potential started to decrease for specimens with active defect experiencing the discharge of the surface. Comparatively, for specimens with a passive layer on the coating defect, the potential gradually increases and almost keeps constant. The potential decay difference in this case is attributed to the existence of iron oxide. Decay of potential is influenced by the surface conditions during CP conditions and due to a dielectric or corrosion product compound. The dielectric material can be assumed as a no perfect capacitor due to a current leakage and charge accumulation within the dielectric material, this latter is capture on the off potential. The smaller decay in passive conditions could be attributed to the capacitor formed in the local coating defect due to the dielectric.

The current provided to the system makes the capacitor formed to charge as double layer, contrary to the active that produces a big change in potential when the off condition exists due to the current drained at the active surface location. For the potential of −1.064 V/SCE (−1 V/CSE), the potential decay behavior for active and passive defects shows similar behavior as for less polarization conditions. A continuous decreasing potential is displayed for the active defect and the constant potential for passivated defects at longer times. A more negative cathodic potential of −1.464 V/SCE (−1.4 V/CSE) shows the same trend but with different potential magnitudes. The trends for each CP level mark the active (active dissolution and pitting) vs. passive conditions considers three levels of severity based on the surface conditions.

Figure 11A:
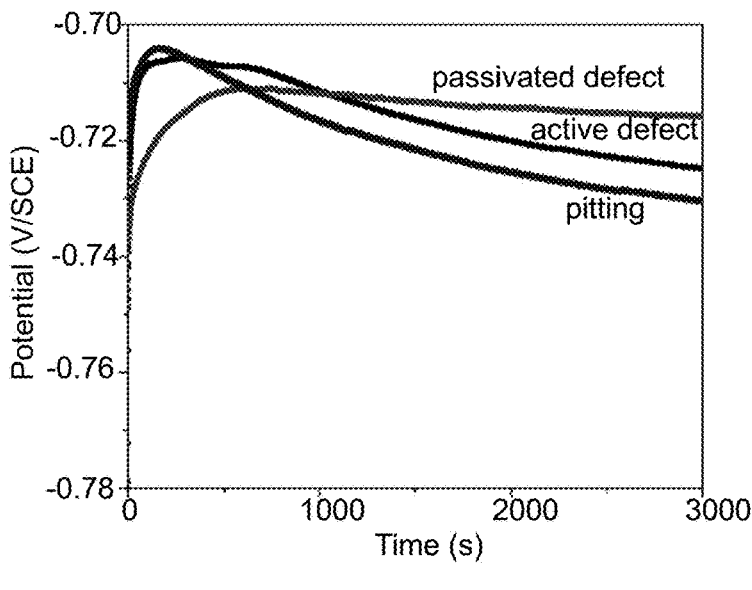
FIGS. 11A-11C show the potential change after cutting the cathodic potential of FBE coating with active/passivated defect under potential of −0.914 V/SCE (−0.85 V/CSE) (FIG. 11A), −1.064 V/SCE (−1 V/CSE) (FIG. 11B) and −1.464 V/SCE (−1.4 V/CSE) (FIG. 11C).
Figure 11B:
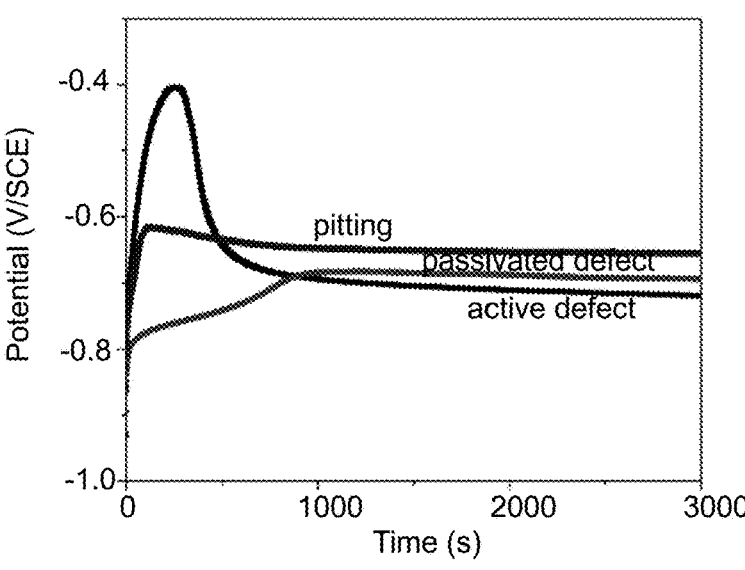
Figure 11C:
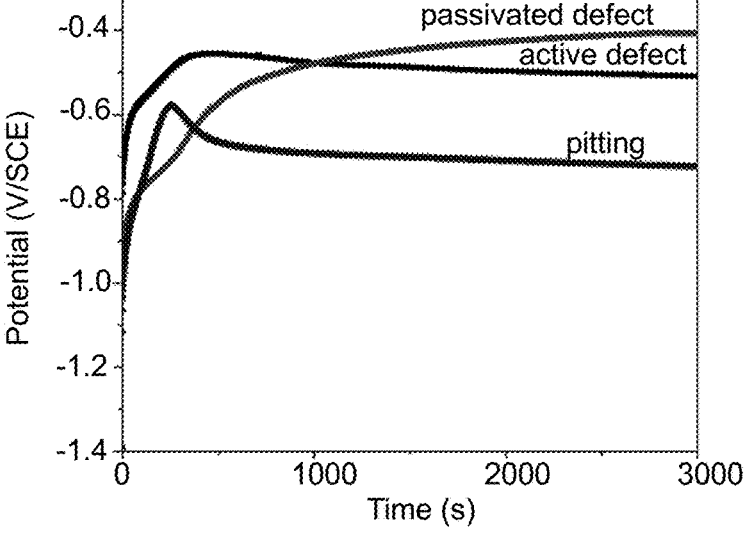

For FBE coating samples, under all different cathodic potentials, the specimens with active and passivated defect seem to have less potential gradient following the cutting off the cathodic protection as illustrated in FIGS. 11A-11C. The characteristics of the coating are different, the coal tar shows more impedance properties than the FBE. The current impress by the cathodic protection to the coating distributes differently with the coating properties influencing the charge distribution at the coating and the defect region. The potential profiles during the instant off at the coating defect shows characteristic decay due to the surface properties of the metallic structure. FIGS. 11A-11C illustrate the same trend for active and passive surface conditions when different CP levels are supplied to the immersed sample. Both coatings shown a characteristic decay when they have different severity conditions on the metallic surface.

Figure 12:
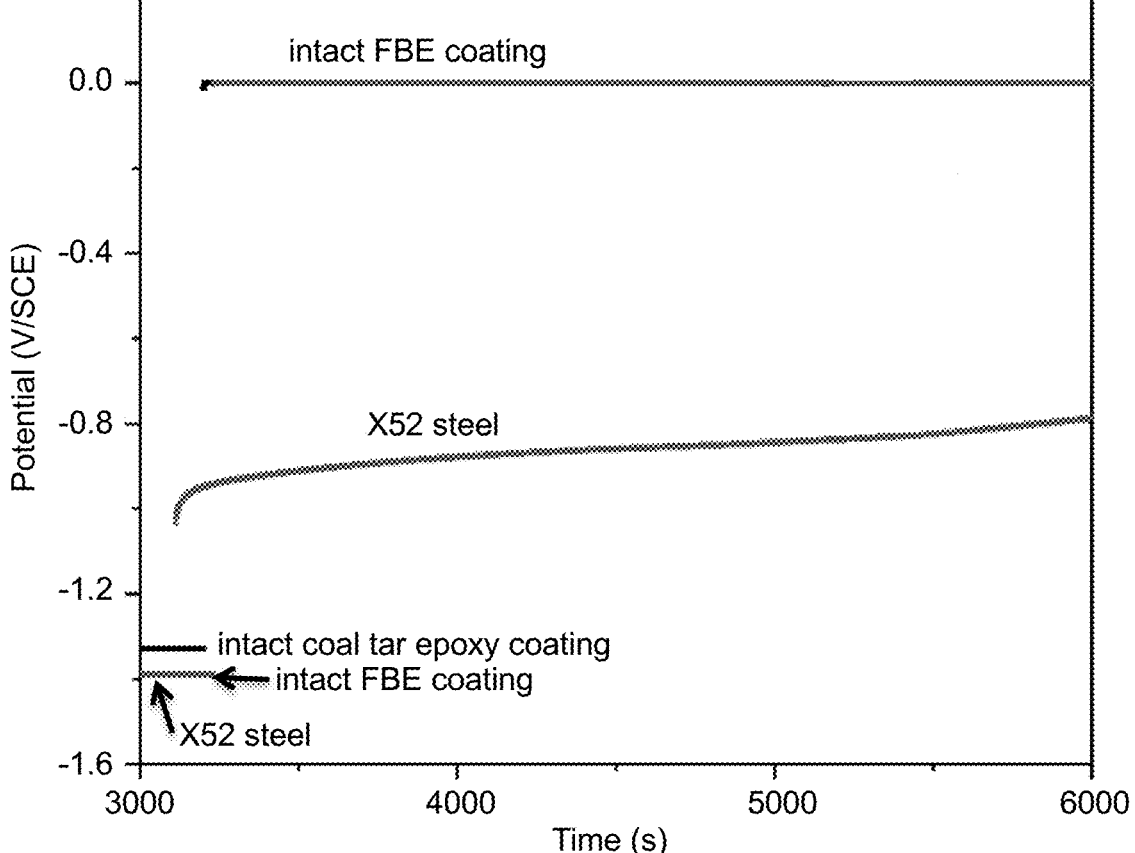
FIG. 12 shows the potential change after cutting the cathodic potential of intact FBE/coal tar coating under potential of −1.464 V/SCE (−1.4 V/CSE).

The potential of intact coating instantly changes and shows no slope or decay potential in FIG. 12 due to the dielectric insulation of the physical barrier coating during immersion. The IR was the dominating factor during the instant off potential during intact conditions for both coatings. There is no influence on the metallic surface characteristics that could be due to the cathodic or anodic polarization but only the IR. The potential change of X52 bare steel during the off potential conditions shows a potential relaxation change equivalent to the active surface conditions, the surface has no high impedance and the current drainage dissipates faster due to more homogeneous current distribution along the surface during CP conditions. The bare steel magnitude reaches value at −1.064 V/SCE (−1 V/CSE) following a−1.464 V/SCE (−1.4 V/CSE) CP bias potential conditions, the potential decay is slowly following the maximum potential peak. The discharge is very fast in the short term and decreases slowly afterwards.

EIS Characterization Under Cathodic Protection

Figures 13A, 13B, 13C:
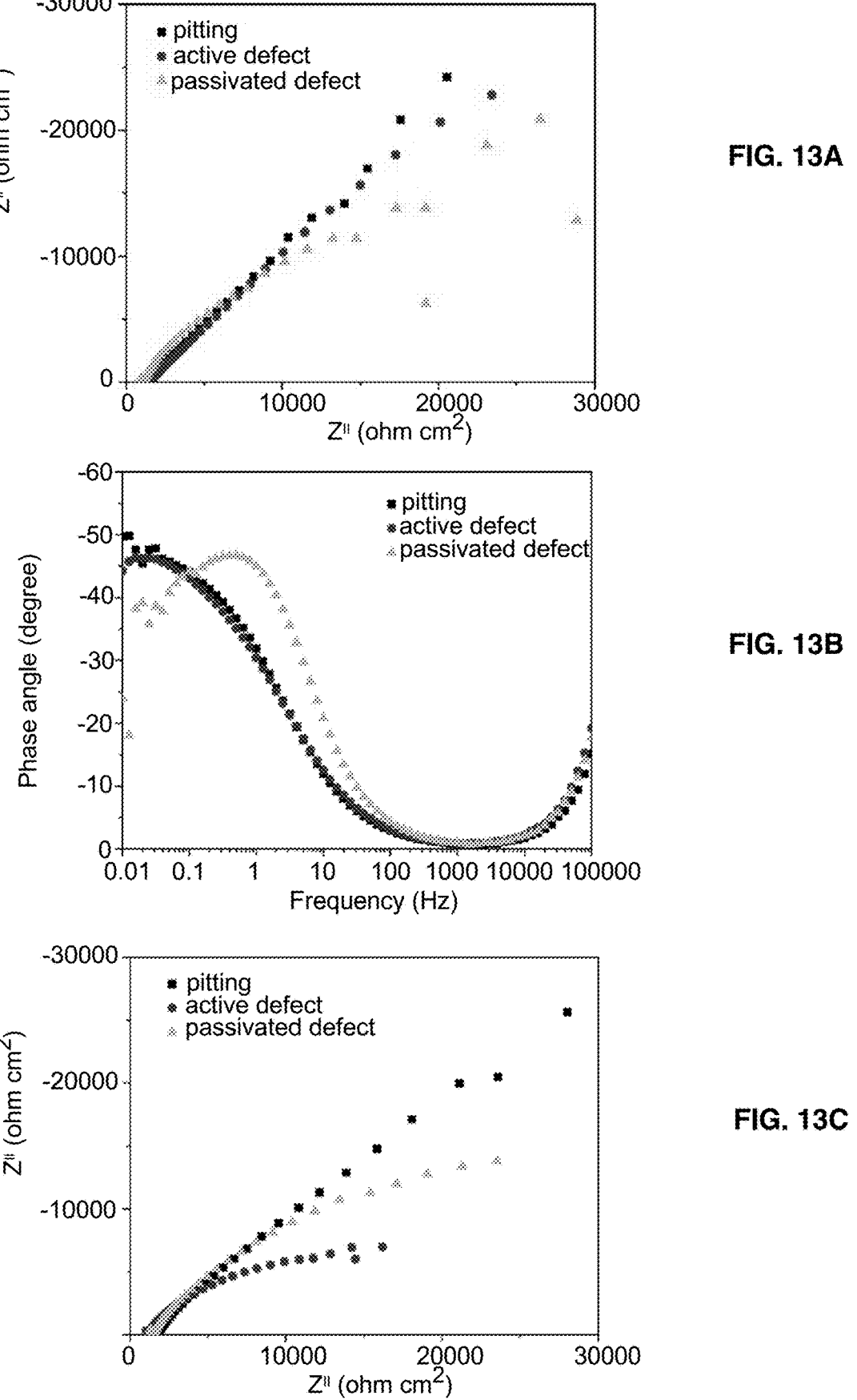
FIGS. 13A-13F are nyquist plots and phase angle plots of X52 steel with coal tar coating under potential of −0.914 V/SCE (−0.85 V/CSE) (FIGS. 13A-13B), −1.064 V/SCE (−1 V/CSE) (FIGS. 13C-13D) and −1.464 V/SCE (−1.4 V/CSE) (FIGS. 13E-13F).
Figures 13D, 13E, 13F:
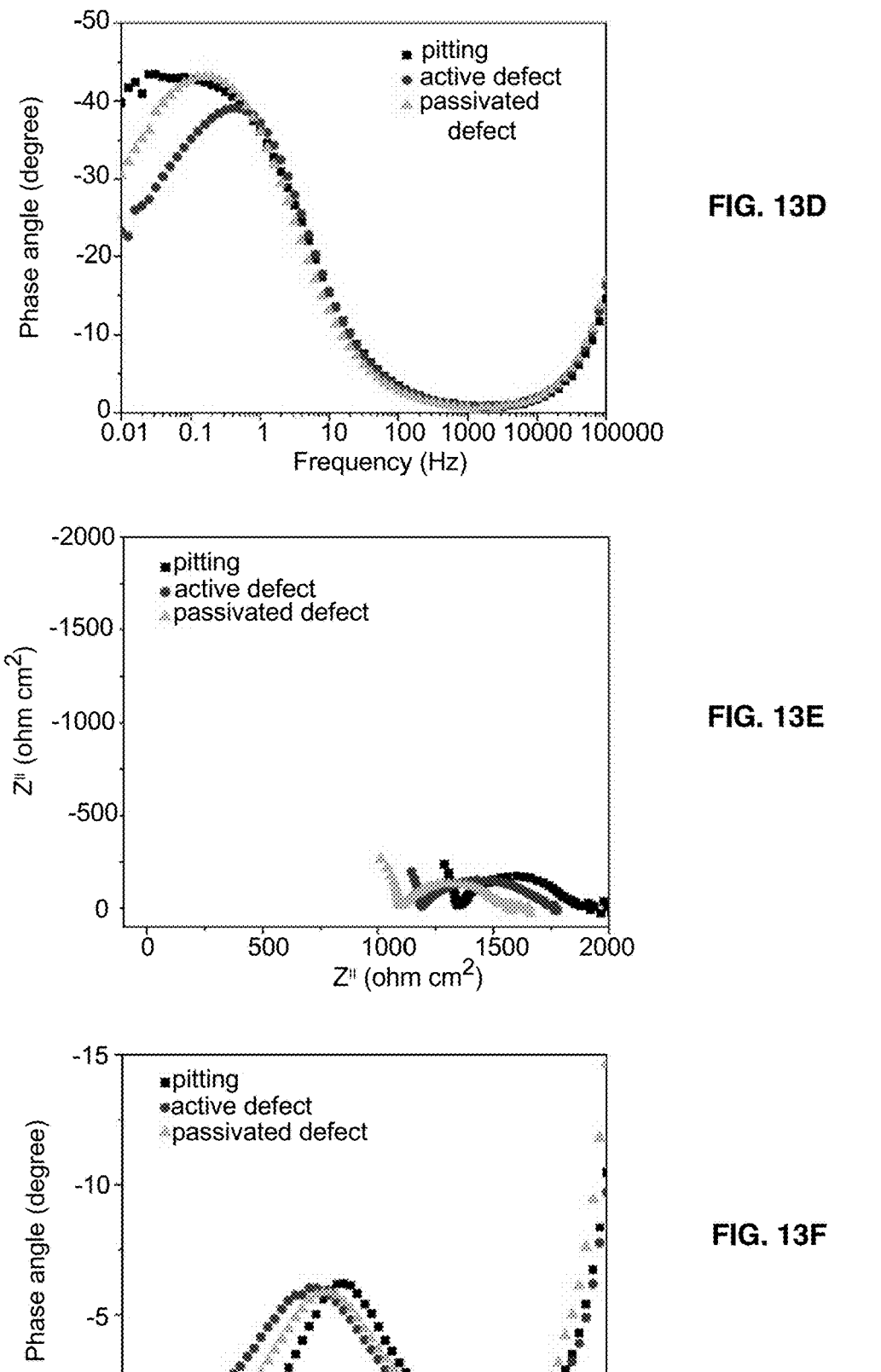

The EIS plots of coal tar coating with defects under different potentials and surface states are presented in FIGS. 13A-13F. Generally, the impedance signature is characteristic of capacitance behavior and charge transfer control mechanism. FIG. 8A-8F present the surface conditions when there are three different surface conditions, such as active surface, localized active (pitting) and passive surface conditions. Under bias potential the polarized conditions are captured at −0.914 V/SCE (−0.85 V/CSE). The complex signature in FIG. 13A shows charge transfer control with a capacitance like behavior, resolved by a semicircle shape of the Nyquist plot. FIG. 13B displays at low frequencies a time constant characteristic of a capacitance. Prior to the instant on-off potential conditions resolved by EIS plots demonstrated different surface conditions producing different potential relaxation pathways, this latter due to the dielectric or condition prevailed at the surface. When the bias potential is higher at −1.064 V/SCE (−1 V/CSE) the EIS plots shows very distinctive surface conditions prior the off potential. The passive state considers higher phase angle magnitude and higher charge transfer resistance. Both parameters are a consequence of a corrosion product layer. The layer formed by a semiconductor (i.e. iron oxide) that distributes the charge or bias potential differently than a metal free oxide layer. When the instant off is applied, the decay faces different recovery and relaxation pathways.

When the surface is clean of corrosion products or active state reflects certain corrosion, rate based on the electrochemical properties as illustrated in FIG. 13A. With the corrosion products or passive state of the surface the corrosion rate is stable and has different magnitude than active state. The kinetic properties of the surface translate in different levels of corrosion rate or dissolution severity. The off potential is able to detect such differences, this latter might be due to the charge storage difference at the formed interface. At higher bias polarization potential at −1.464 V/SCE (−1.4 V/CSE) the interface conditions show similar behavior for active and passive conditions in FIGS. 13E-13F. During bias potential, the interfacial processes show a capacitance like behavior as illustrated in a well-defined time constant on the phase diagram. When the off potential is applied following the highest polarized bias potential, the differences are shown for each "severity condition". During polarization state conditions the EIS signature shows how the time constant (maximum magnitude in the plot) in the phase angle representation illustrates the capacitance behavior. Higher bias potential helps to define the shape of the phase angle, the maximum magnitude shift from high frequencies to mid frequencies and also decrease the phase angle magnitude. Electrochemical characterization resolves the capacitance characteristics that could be the features to distinguish surface or severity conditions when we have the off potential conditions.

Classification and Quantitative Analysis for the Surface Severity

Figure 14A:
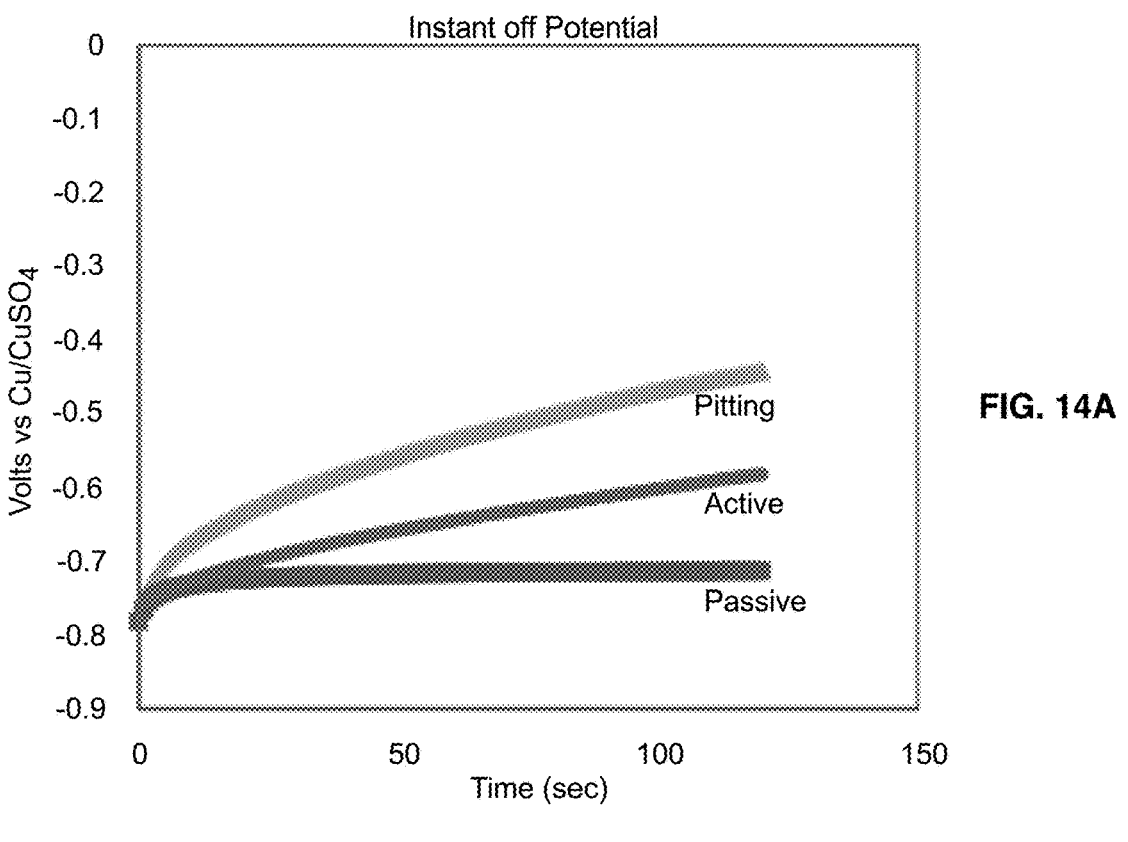
FIGS. 14A-14B are instant off relaxation graphs for −0.914 V/SCE (−0.85 V/CSE) prior instant off for coal tar coating with different surface severity conditions.
Figure 14B:
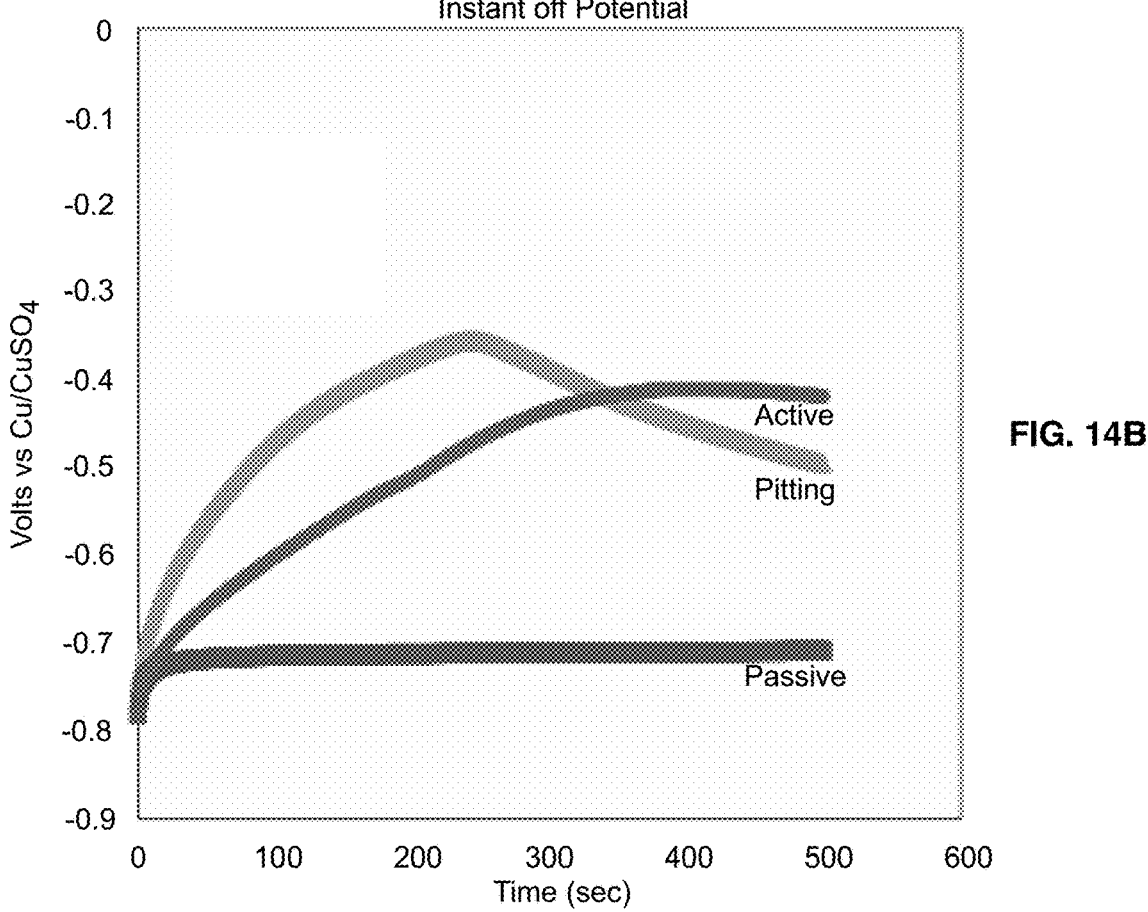

FIGS. 14A-14B show two different instants off potential regions at different relaxation times for −0.914 V/SCE (−0.85 V/CSE) and coal tar enamel. The differences include the surface severity condition of the coating defect on the sample surface. FIGS. 10A-10C demonstrated how different the discharge rate was affected by the surface conditions prior the off potential. Potential relaxation plot shows different regions, it is very explicit the evolution of discharging can be divided in different zones due to the influence of IR and surface conditions. Since the IR remains constant due to the control conditions of the electrolyte, the distinction is marked due to the surface characteristics of the sample. FIGS. 14A-14B are the short term where the slope and relaxation path are different for short term (less than 120 sec), when the relaxation time is longer (up to 500 sec) the differences become more explicit, in light of such differences there are mappings and correlations describing the surface condition proportional to the deterioration or severity. At short term during relaxation time mathematical functions can describe characteristic behavior of each condition. Also, the longer the time of relaxation there are more features to distinguish, however for a detection technique we should be able to consider the short-term relaxation time (<500 sec).

Modeling Potential Relaxation for Classification of External Corrosion Defects

As shown in FIGS. 14A-14B, the trend of the potential relaxation curves can be modeled to determine the measured instantaneous relaxation voltage V along time. The model may be based on the initial voltage $V_0$, i.e., the on-potential, the initial time $t_0$ when cathodic protection (CP) is switched off (in laboratory conditions $t_0$ may assumed to be zero) and model parameters $\tau$, n to characterize the type of defect given an initial CP level. As in the previous sections, based on initial voltage conditions, the corresponding observed relaxation paths follow different patterns. More specifically, for a given initial CP voltage level, each defect type shows a different decay path mode, which can be attributed to the condition of corrosion products on the surface showing the capacitive behavior at the interface changes. The two parameters determine the relationship between voltages discharged by the capacitive film over time and hence for a known $V_0$ these two parameters can be used to distinguish pitting, active and passive defects in a quantitative manner. It was demonstrated that $\tau$ has the most effect on the time interval for reaching a stable relaxation potential value and that the parameter n plays a dominant role in affecting the potential value of the final stable stage.

In the field, CP voltage measurements are conducted along the pipeline right of way (ROW). CP ON voltage correspond to $V_0$ and the measurement of voltage time series for time $t \leq 00$ seconds can help to determine the relaxation constants $\tau$ and n. The variation of these parameters along the ROW can hence give better insights of the underlying pipeline corrosion conditions. As the large scale soil environment along the ROW changes, comparison of $\tau$ and n must be done under similar soil conditions. Therefore, based on environmental data (7-8) and CIPS measurements, the new proposed relaxation potential characterization technique can better indicate regions of severe pipeline corrosion.

The following references are cited herein.

1. Kim et al. Journal of Pipeline Science and Engineering, 1:17-35, 2021.
2. Wang et al. Process Safety and Environmental Protection, 123:179-189, March 2019.
3. Sosa et al. Anti-Corrosion Methods and Materials, 66(1): 115-120, 2019.
4. Li et al. International Journal of Pressure Vessels and Piping, 146:161-170, 2016.
5. X. Li and H. Castaneda, Corrosion Engineering Science and Technology, May 2015.
6. Li et al. Corrosion, 70(6):615-626, 2014.
7. Yajima et al. International Journal of Pressure Vessels and Piping, 126:37-47, 2015.
8. Yajima et al. Journal of Structural Safety 54:19-31, 2015.

What is claimed:

1. A non-invasive and non-destructive inspection method for detecting and classifying coating failures on a buried metallic pipeline, consisting of:
   a) selecting an inspection area on the coating on the buried metallic pipeline; said coating comprising part of a cathodic protection system for the buried metallic pipeline;
   b) disconnecting a continuous cathodic protection of the buried metallic pipeline;
   c) producing a profile of a change in the cathodic protection based on a polarization decay thereof at the inspection area over a period of time;
   d) correlating the profile with a coating failure or lack thereof at the inspection area via a comparison to a corrosion severity database;
   e) classifying a severity of the coating failure as an active surface failure, an active surface with pitting failure, a bare metallic surface failure, or a passive surface failure; and
   f) selecting at least one additional inspection area on the buried metallic pipeline and repeating the method steps b) to e) to produce at least one additional profile.

2. The method of claim 1, wherein the profile is one of potential decay measured at select acquisition times within the period of time.

3. The method of claim 1, wherein the profile is one of instantaneous relaxation potential measured at select acquisition times within the period of time.

4. The method of claim 1, wherein the coating type is a single layer fusion bonded epoxy coating, a three layer fusion bonded epoxy coating, a multilayer fusion bonded epoxy coating, or a coal tar.

5. The method of claim 1, wherein the buried metallic pipeline is an underground pipeline or a submerged pipeline.

6. A method for classifying a severity of a corrosion defect on an external coating on a buried metallic pipeline, consisting of:
   in a non-invasive and non-destructive process:
      a) selecting a test point on the external coating disposed on the buried metallic pipeline, said external coating comprising part of a cathodic protection system;
      b) switching off voltage to the cathodic protection system on the buried metallic pipeline;
      c) acquiring an instantaneous potential relaxation at a plurality of acquisition times at the test point;
      d) producing a potential relaxation curve from the acquired instantaneous potential relaxation at the plurality of acquisition times;
      e) comparing the potential relaxation curve to a database of potential relaxation curves of a severity level of the corrosion defect;
      f) classifying the severity level of the corrosion defect as active dissolution, pitting, passive, or no corrosion; and
      g) selecting at least one additional test point on the buried metallic pipeline and repeating the method steps b) to f).

7. The method of claim 6, wherein the external coating is a single layer fusion bonded epoxy coating, a three layer fusion bonded epoxy coating, a multilayer fusion bonded epoxy coating, or a coal tar.

8. The method of claim 6, wherein the metallic pipeline is an underground pipeline or a submerged pipeline.

9. A non-invasive and non-destructive inspection method for a buried metallic pipeline with a cathodic protection system, consisting of:
   selecting a plurality of inspection places along an external coating disposed on the buried metallic pipeline; wherein the external coating is part of the cathodic protection system;
   turning off the cathodic protection system to the metallic pipeline;
   recording a potential relaxation curve from a plurality of instantaneous relaxation voltages each acquired at a predetermined time point for each of the plurality of inspection places;
   comparing each of the potential relaxation curves to a database of potential relaxation curves that are correlated with a severity level of corrosion; and
   identifying each of the plurality of inspection places on the external coating on the buried pipeline as comprising the severity level of corrosion that is active dissolution, pitting or passive or without corrosion.

10. The method of claim 9, wherein the external coating is a single layer fusion bonded epoxy coating, a three-layer fusion bonded epoxy coating, a multilayer fusion bonded epoxy coating, or a coal tar.

11. The method of claim 9, wherein the buried metallic pipeline is underground or underwater.

* * * * *